United States Patent [19]

Nakamura

[11] Patent Number: 5,148,902
[45] Date of Patent: Sep. 22, 1992

[54] ELECTROMAGNETIC COUPLING DEVICE

[75] Inventor: Hiroaki Nakamura, Ise, Japan

[73] Assignee: Shinko Denki Kabushiki Kaisha, Tokyo, Japan

[21] Appl. No.: 614,599

[22] Filed: Nov. 15, 1990

[30] Foreign Application Priority Data

Nov. 15, 1989 [JP] Japan .............................. 1-132083[U]

[51] Int. Cl.⁵ .............................................. F16D 27/00
[52] U.S. Cl. ................................. 192/84 B; 192/84 C; 403/372
[58] Field of Search ........................... 192/84 B, 84 C; 403/372, 365

[56] References Cited

U.S. PATENT DOCUMENTS

| | | | |
|---|---|---|---|
| 3,624,768 | 11/1971 | Nussli | 192/84 C |
| 4,570,768 | 2/1986 | Nishimura et al. | 192/48.2 X |
| 4,664,238 | 5/1987 | Nishino et al. | 192/84 B X |
| 4,813,808 | 3/1989 | Gehrke | 403/372 X |
| 4,981,390 | 1/1991 | Cramer, Jr. et al. | 403/372 X |

FOREIGN PATENT DOCUMENTS

| | | | |
|---|---|---|---|
| 91096 | 6/1961 | Denmark | 403/372 |
| 1157853 | 11/1963 | Fed. Rep. of Germany | 403/372 |
| 63-29949 | 8/1988 | Japan . | |

Primary Examiner—Leslie A. Braun
Assistant Examiner—Andrea Pitts
Attorney, Agent, or Firm—Oblon, Spivak, McClelland, Maier & Neustadt

[57] ABSTRACT

An electromagnetic coupling device is proposed to obviate several drawbacks in the conventional devices, namely, to prevent loose fixing in axial direction which gives rise to undesirable rotation of the rotary shaft following the rotor, to reduce the production cost due to the use of magnetic pole in the rotor, to reduce lengthy lengthy assembly work brought about by many fixing rings and to prevent slipping out of the hub and the rotary shaft encountered in the conventional coupling devices.

In order to obviate the drawbacks encountered in the conventional coupling device, a rotor retainer is placed around the rotary shaft to urge a rotor against a hub, in addition, the rotary shaft is provided with fixing portions of a minimum number, such as axially extending legs at least one of which is attached with a claw, stepped portions, a groove and so forth for preventing slipping out of the rotary shaft, hub and driven shaft.

By virtue of such simplified structure, assembly of the related parts and components has remarkably reduced together with reduced production cost.

6 Claims, 3 Drawing Sheets

ELECTROMAGNETIC COUPLING DEVICE

BACKGROUND OF THE INVENTION

1. Field of the Invention

The present invention relates to an electromagnetic coupling device, for example, to be used for feeding a set of papers in a copying machine.

2. Description of the Prior Art

Heretofore, there has been proposed, for example, an electromagnetic coupling device as disclosed in Japanese Utility Model Examined Publication No. Sho 63 (1988)-29949 having a construction as shown in FIG. 1 of the accompanying drawings with an intention to improve the devices as shown by FIG. 2 of this application, the same as FIG. 4 of the above-mentioned Utility Model Examined Publication No. Sho 63 (1988)-29949, which corresponding to U.S. Pat. No. 4,664,238 shown as one of the prior arts aimed to be improved on. The electromagnetic device as shown by the above-mentioned FIG. 2 is constructed in a manner as explained below.

Referring now to FIG. 2, numeral 1 denotes a stator as a yoke which receives therein a coil 2 and is fixedly engaged with a stationary member (not shown).

Numeral 3 is a rotor as one of a coupling member being fixedly attached with a lining 4 and is forcibly fitted around the outer periphery of a hollow rotary shaft 5 fabricated of an iron series magnetic material.

Numeral 6 designates a hub generally formed as a cylindrical member by plastic molding or by sintering alloy powders and the outer periphery of which is provided with a gear and is directly fitted around the outer periphery of said rotary shaft 5 so as to be permitted for relative slidable rotation.

Numeral 8 is a return leaf spring attached to the hub 6 and the portion which faces the said lining 4 is attached with an armature 9, as the other coupling member by means of a rivet 10.

A predetermined extent of gap g is maintained between the armature 9 and the rotor 3. Numeral 11 is a metal of an iron series alloy inserted between the stator 1 and the rotary shaft 5, 12 a spacer, 13 and 14 are retaining rings fitted around the rotary shaft 5 for positioning the stator 1, rotor 3 and the hub 6 in axial direction.

Numeral 15 in the drawing denotes a set screw for fixing the electromagnetic clutch to a driven shaft 16, which is normally inserted, at the operation site of the user, into the central opening of the hollow rotary shaft of the coupling device assembled and shipped from the manufacturer without placing such a driven shaft.

The electromagnetic coupling device or clutch of modified construction shown in FIG. 1 is constructed in a manner as explained below.

In FIG. 1, the same reference numerals are placed to the parts or components which are substantially the same as or similar to those shown in FIG. 2 and the detailed explanation thereof are omitted.

In FIG. 1, numeral 17 denotes a rotor which differs from the rotor 3 shown in FIG. 2 with respect to its feature that its magnetic pole 18 is formed such that a magnetic flux Φ directly flows through an air gap $g_1$. Numeral 19 denotes a rotary shaft fabricated of a non-magnetic oil impregnated plastics by molding technique, to which above-mentioned stator 1 and hub 6 are slidably attached.

The outer peripheral surface of the rotary shaft 19 is integrally formed with stepped portions 20 and a groove 21, respectively, as a fixing portion or portions and a straight ridge portion 22 as a fixing portion for positioning the rotor 17 in a circumferential direction.

In addition, the inner surface of the rotary shaft 19 is integrally formed with a fitting face 19a to be fitted onto the so-called D-cut face 23 of the driven shaft 16 so that the rotary shaft 19 will never rotate relative to the driven shaft 16.

Numeral 24 is a retaining ring to be fitted into the above-mentioned groove 21 for positioning the hub 6 in an axial direction.

The modified conventional electromagnetic clutch shown in FIG. 1 and explained above, however, still has several drawbacks as mentioned below.

(1) The rotor 17 can be secured, by virtue of the straight ridge portion 22, with respect to the rotary shaft 19 in the direction of rotation, so that these two members always rotate integrally. However, since they are fixed through the aforesaid straight ridge in axial direction, when the rotor 17 shifts toward the other coupling members 6 and 9, it is liable to be accompanied by an undesired rotation of the rotary shaft 19 following the rotation of the rotor 17.

(2) If the length of the magnetic pole 18 of the rotor 17 is reduced, the rotor 17 would become unstable, since the rotor 17 is liable to incline.

In addition, due to the fact that it necessitates magnetic pole 18, the cost for making the rotor 17 become inevitably expensive.

(3) Two retaining rings 24 and 24' shown in FIG. 1 bring about lengthy man hours in setting work and high production cost.

In other words, both the retaining ring 24 for preventing the hub 6 from escaping from the rotary shaft and the other retaining ring 24' for preventing the rotary shaft 19 from its slipping out from the driven shaft 16, are indispensable, and these two members are liable to increase the production cost as explained above, and (4) Since the rotary shaft 19 and the rotor 17 are mechanically joined together, there is no such serious problems as in the above items (1) and (2), but the rotary shaft 19 made of magnetic soft iron results in high production cost.

SUMMARY OF THE INVENTION

The present invention aims to solve the drawbacks as mentioned above.

Consequently, an object of the present invention is to provide an electromagnetic coupling device having improved configuration comprising, a rotor obtained by simplifying the configuration of the conventional rotor 17 and a rotary shaft of modified shape so as to prevent axial displacement of the rotor.

Another object of the present invention is to improve the way of assembling the hub, rotor and the like to the rotary shaft.

DETAILED DESCRIPTION OF THE PREFERRED EMBODIMENT

A preferred embodiment of the present invention will be described with reference to the accompanying drawings.

Figure 1:
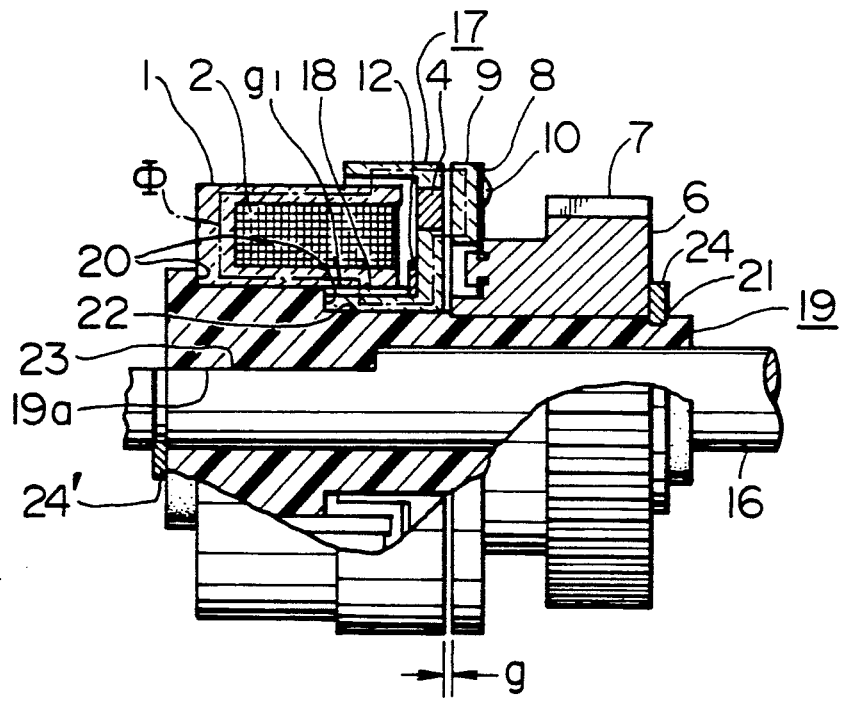
FIG. 1 is a cross sectional view of a conventional electromagnetic coupling device as proposed by Japanese Utility Model Examined Publication No. Sho 63-29949.
Figure 2:
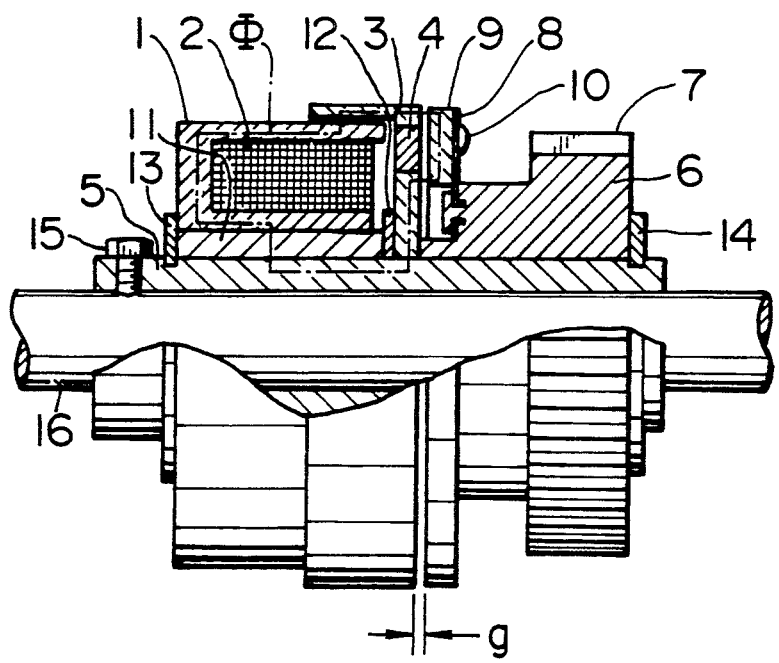
FIG. 2 is a cross sectional view of a conventional electromagnetic coupling device as explained as one of the prior art device aimed to be modified by aforesaid Japanese Utility Model Publication No. Sho 63-29949.
Figure 3:
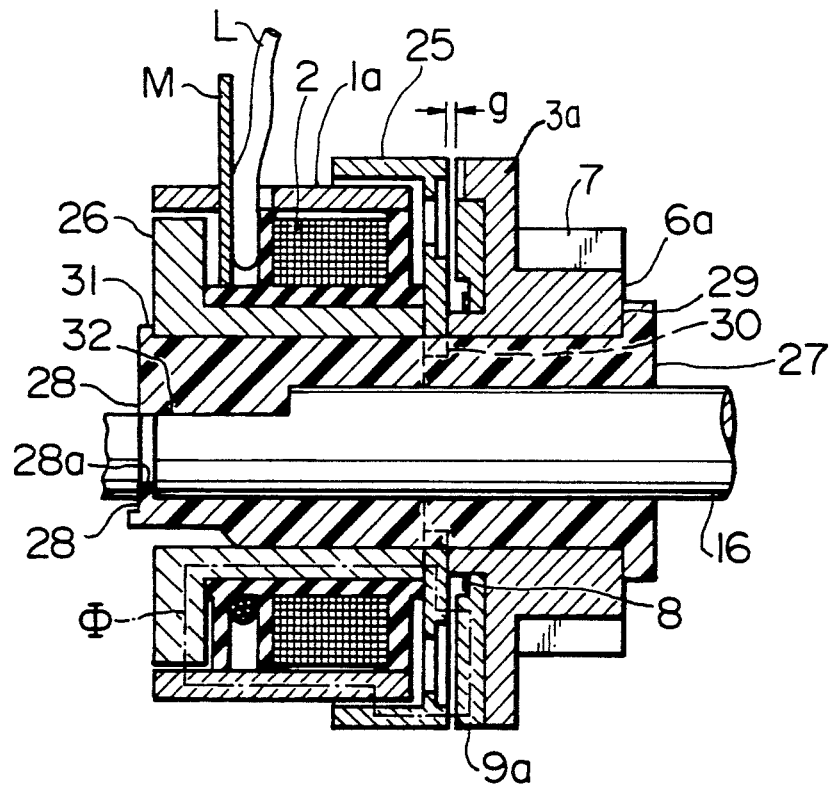
FIG. 3 is a cross-sectional side elevational view of a preferred embodiment of the electromagnetic coupling device according to the present invention taken along line III—III of FIG. 4.
Figure 4:
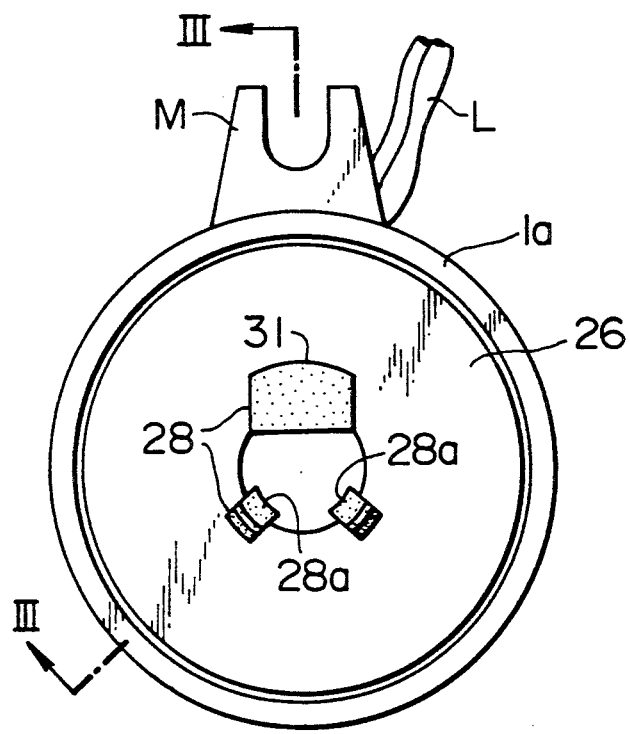
FIG. 4 is a left front view of the electromagnetic coupling device shown in FIG. 3.
Figure 5:
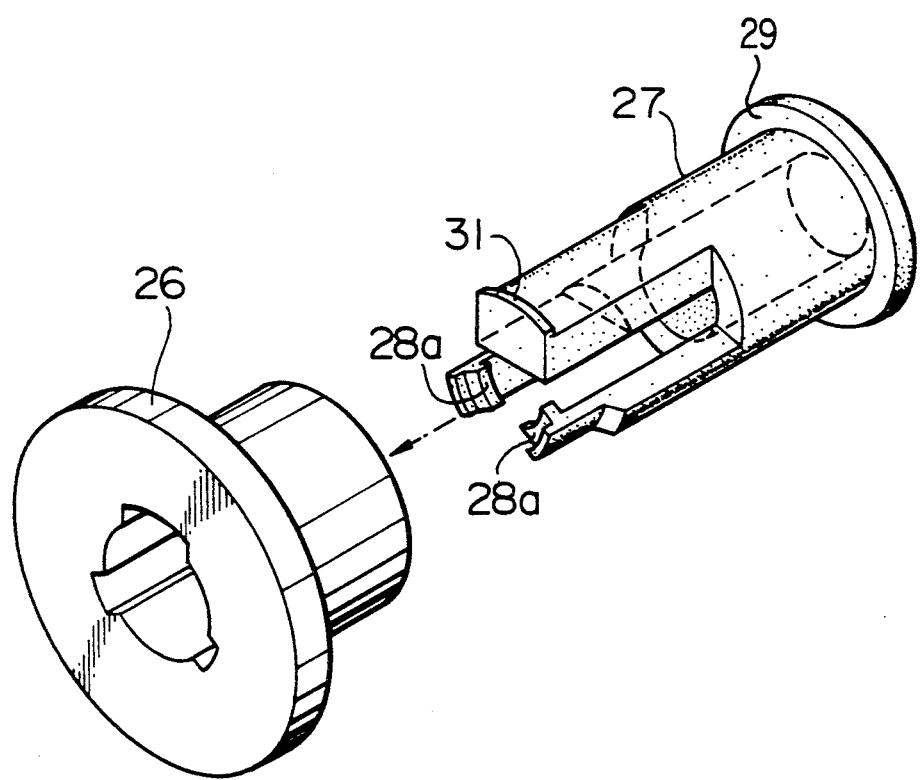
FIG. 5 is an exploded perspective view of a rotor retainer and a rotary shaft according to the present invention.

In FIGS. 3, 4 and 5, the parts or components the same as or equivalent to those shown in FIGS. 1 and 2 of the conventinal device are designated by the same reference numerals, so the detailed description of these parts or components designated by the same numerals will not be repeated.

In the above drawings, numeral 1a denotes a stator, 2 is a coil, similarly 6a a hub formed with a gear 7, 16 is a driven shaft, and 27 designates a rotary shaft.

Numeral 25 designates a rotor being attached to the rotary shaft 27 so that these two parts are not allowed to relatively rotate, in the manner the same as the rotor 3 shown in FIG. 2.

Numeral 26 denotes a rotor retainer attached around the rotary shaft 27 so as to urge the rotor 25 toward the hub 6a. The rotary shaft 27 is fabricated of a nonmagnetic material having low frictional resistance and having a body formed with a plurality of circumferentially spaced, axially extending flexible legs 28. Three legs are formed in this embodiment, having a length about one half of the rotary shaft and stemming out from the intermediate portion and ending in the left axial end, and these legs 28 being inserted in the hollow rotor retainer 26 and tightly fitted on the inner surface of the rotor retainer 26.

These legs are formed by axially splitting the hollow cylindrical body of the half made rotary shaft 27 from its one (left) axial end as shown in FIG. 5, toward the axially intermediate portion of the rotary shaft 27, so that these legs can parallely extend along the axis of rotation of the driven shaft 16.

The outer face of the rotary shaft 27 is formed with several functioning portions, namely, a stepped portion 29 formed as a fitting portion at its right axial end adjacent to the hub 6a for positioning the hub, a groove 30 as a fixing portion at its axially middle part for positioning the rotor 25, while the other (left) axial end at the side contacting the rotor retainer 26 is formed with a fixing portion 31 for positioning the rotor retainer 26.

In addition, the inner face of the hollow cylindrical rotary shaft 27 is D-cut to have a fitting face 32 so that the driven shaft 16 can be fitted with the rotary shaft 27 without causing any relative rotation between these two mating members.

Among the plurality of legs 28, at least one leg, though two legs in this embodiment, are provided at each of their distal axial end, with an inwardly directing claw 28a as shown in FIGS. 3, 4 and 5, for preventing the driven shaft 16 from axially slipping out outside the rotary shaft and also for assisting ready assembly of the coupling device of this invention.

Although in this embodiment, the rotary shaft 27 is explained as having been made of nonmagnetic material having low frictional resistance such as oil-impregnated plastics, it is not necessary to be restricted to such a nonmagnetic material, but even magnetic materials also can be used, so long as the split legs have sufficient extent of flexibility under depression for assembly.

In FIGS. 3 and 4, reference characters "L" and "M" designate, respectively, lead wires and a support.

In time of assembling the hub 6, rotor 25 and rotor retainer 26 onto the rotary shaft 27, firstly the legs 28 disposed at the lower part of the free end of the two split legs 28 are depressed radially and inwardly to reduce the outside diameter defined by these legs 28, then the hub 6a is passed over the free end having the thus reduced diameter until the front end of the hub 6a arrives at its set point at the other end opposite to the free end.

Next, the rotor 25 is attached onto the rear end face of the hub 6a, then the rotor retainer 26 is attached to the rear end face of the central part of the rotor 25 and then the depressed legs 28 are released to return to their undepressed state. Thereafter, the thus assembled electromagnetic coupling device is ready for fitting its rotary shaft 27 around a driven shaft 16 of a rotary machine, normally at the user's operation site as already explained.

In operation, when the exciting coil 2 is energized, magnetic flux Φ is generated to form a magnetic circuit so as to attract the armature 9a toward the rotor 25 against the spring force given by the leaf spring 8. As a result, the torque of the driving side is transmitted to the driven shaft 16, via the hub 6a armature 9a, rotor 25 and the rotary shaft 27.

When supply of an electric current is stopped, the magnetic flux Φ disappears and the armature 9a will retract from the contact with the rotor 25 and the driven shaft 16 will be stopped.

According to the present invention, construction of the electromagnetic coupling device is rendered possible to simplify as compared with the rotor of the prior art ones together with the improved configuration of the rotary shaft, thereby the entire assembly of the hub, rotor and the rotor retainer to the rotary shaft, has been made possible in more simplified and steady manner.

What is claimed is:

1. An electromagnetic coupling device comprising:
   a rotary shaft comprising a hollow body having a plurality of circumferentially spaced, axially extending flexible legs depending therefrom;
   a rotor retainer fitted around an outer periphery of said rotary shaft;
   a hub rotatably mounted on said rotary shaft;
   a rotor fixed to said rotary shaft between said rotor retainer and said hub;
   an armature mounted to said hub and engageable with said rotor; and
   a stator mounted to said rotor retainer and including a coil,
   wherein said rotary shaft comprises:
   a) an inwardly directed claw at a distal end of at least one of said legs for axially retaining the rotary shaft on a driven shaft to which the electromagnetic coupling device is mounted,
   b) a fitting portion for positioning said hub on said rotary shaft,
   c) a fixing portion for positioning said rotor retainer on said rotary shaft, and
   d) a fitting face on said rotary shaft for rotatably positioning said rotary shaft on a driven shaft to which the electromagnetic coupling device is mounted such that there arises no relative rotation of said rotary shaft with respect to said driven shaft.

2. An electromagnetic coupling device as claimed in claim 1, wherein said rotary shaft member is fabricated of plastic.

3. An electromagnetic coupling device as claimed in claim 1 or 2, wherein said rotary shaft member is fabricated of oil impregnated plastic.

4. An electromagnetic coupling device as recited in claim 1 wherein said fitting portion and said fixing portion are formed integrally with said rotary shaft.

5. An electromagnetic coupling device as recited in claim 1 wherein said rotor is pressed axially against said hub by said rotor retainer.

6. An electromagnetic coupling device as recited in claim 1 wherein said rotary shaft further comprises a fixing portion for positioning said rotor on said rotary shaft.

* * * * *